(12) United States Patent
Stirtz

(10) Patent No.: US 8,347,905 B1
(45) Date of Patent: Jan. 8, 2013

(54) ENERGY SAVING FAUCET

(76) Inventor: Ronald H. Stirtz, Creswell, OR (US)

(*) Notice: Subject to any disclaimer, the term of this patent is extended or adjusted under 35 U.S.C. 154(b) by 388 days.

(21) Appl. No.: 12/799,253

(22) Filed: Apr. 20, 2010

(51) Int. Cl.
*F16K 11/06* (2006.01)
*F16K 51/00* (2006.01)

(52) U.S. Cl. ....... 137/1; 137/625.4; 137/636.3; 251/288

(58) Field of Classification Search ............... 137/636.3, 137/636.2, 625.4, 625.41, 625.17, 1; 251/285, 251/288, 286
See application file for complete search history.

(56) References Cited

U.S. PATENT DOCUMENTS

| | | | |
|---|---|---|---|
| 5,082,023 A * | 1/1992 | D'Alayer de Costemore d'Arc | 137/636.3 |
| 5,469,889 A * | 11/1995 | Tang | 137/625.41 |
| 5,992,457 A * | 11/1999 | Humpert et al. | 251/288 |
| 6,390,128 B1 * | 5/2002 | Tung | 137/625.4 |
| 7,337,804 B2 * | 3/2008 | Rosko | 251/288 |
| 7,753,074 B2 * | 7/2010 | Rosko et al. | 137/625.4 |
| 8,118,057 B2 * | 2/2012 | Deutsch et al. | 251/285 |

* cited by examiner

*Primary Examiner* — Kevin Lee
(74) *Attorney, Agent, or Firm* — Robert E. Howard

(57) ABSTRACT

A faucet of the single handle mixing valve type. The faucet includes a housing having a domed housing cap enclosing a valve cartridge having an actuating stem movable along a vertical flow-control axis for varying water flow rate, and movable along a horizontal temperature-control axis for varying the temperature. A handle is connected to the actuating stem. A recess extends vertically along the outer surface of the domed housing cap. A releasable stop member is adapted to engage the recess when the handle is moved along the vertical flow-control axis in its cold water only position, and adapted: to release engagement upon application of a horizontal force. A ramp is located along the lower periphery of the domed housing cap outside of the cold water only position and is adapted to prevent the handle from being lowered into a full off position except when in the cold water only position.

8 Claims, 3 Drawing Sheets

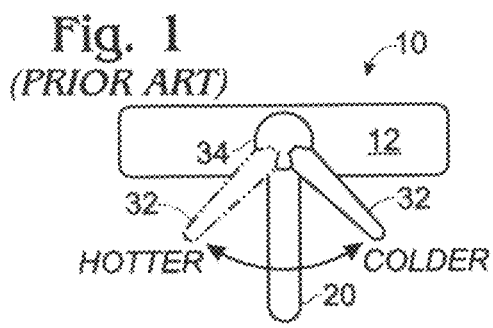
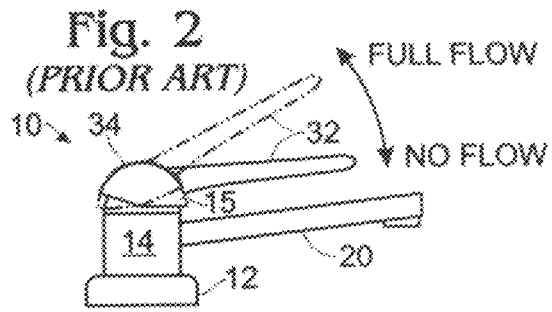
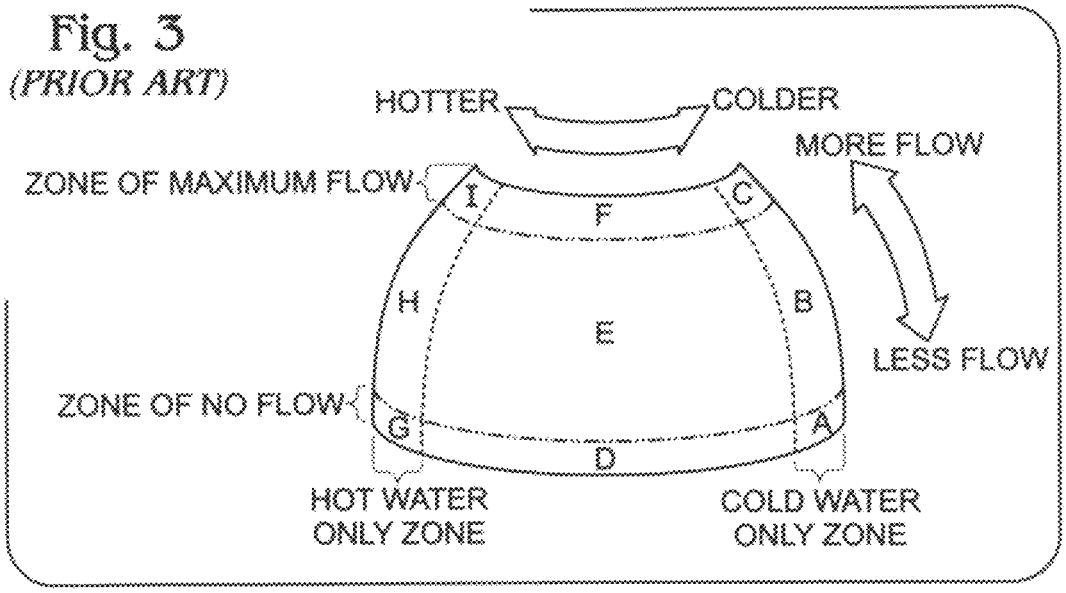
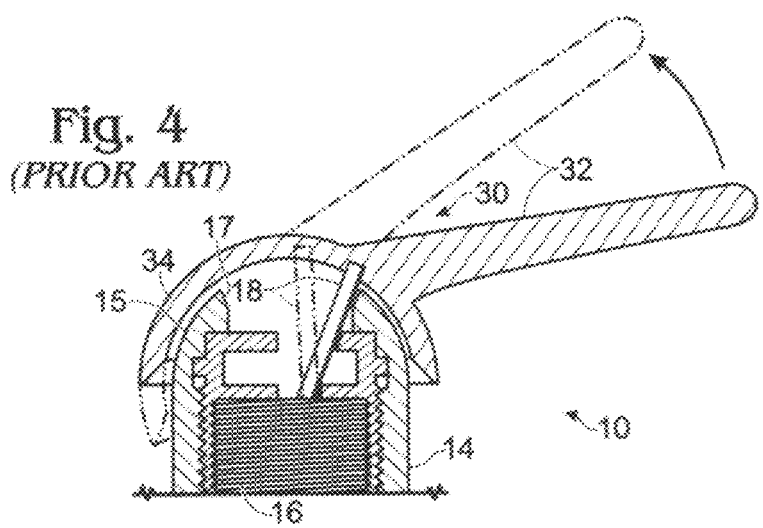

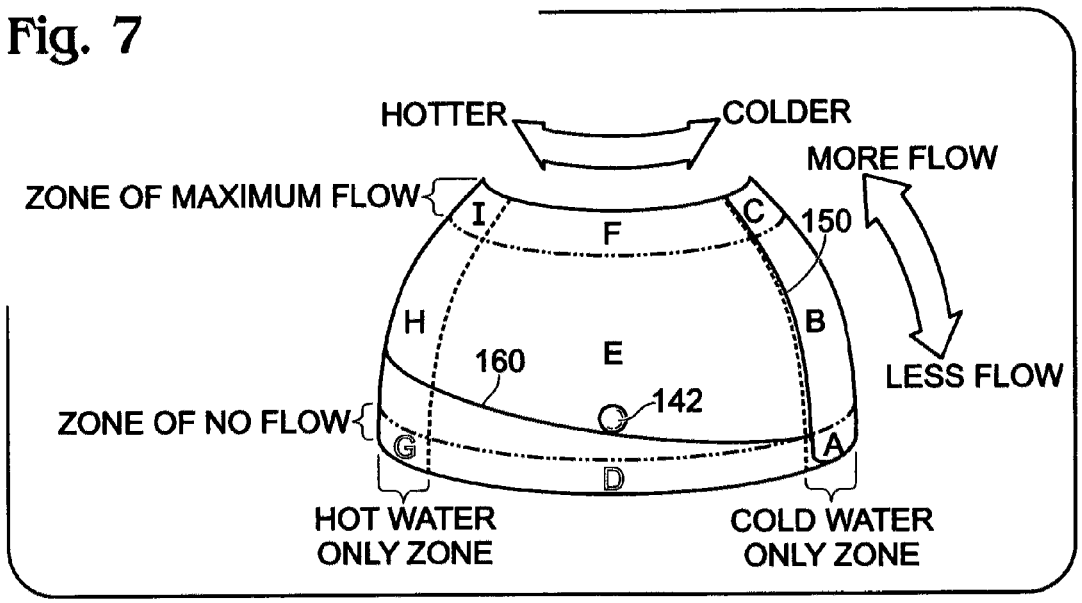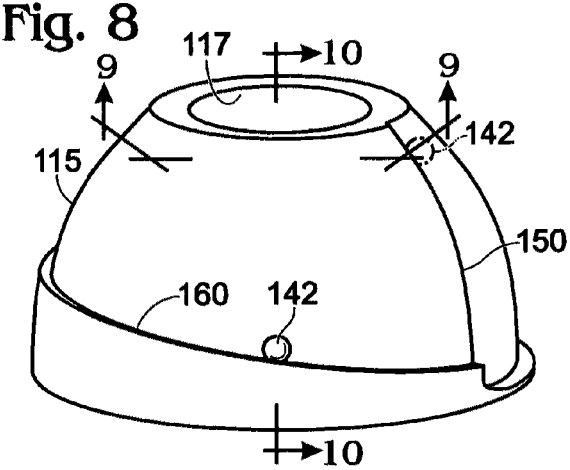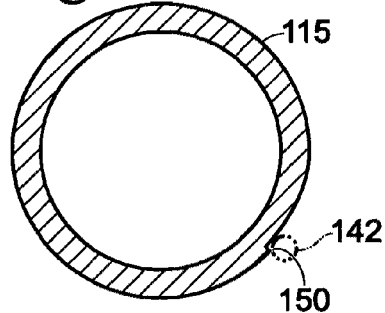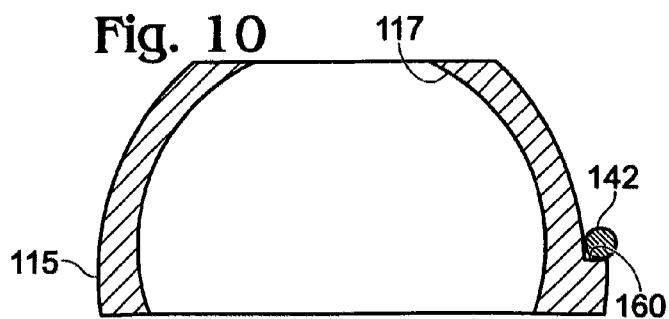

ENERGY SAVING FAUCET

BACKGROUND OF THE INVENTION

The present invention relates to an energy saving faucet of the single handle mixing valve type.

A conventional single handle mixing valve type faucet has a housing having a valve cartridge located therein. The valve cartridge has an actuating stem movable along a substantially vertical flow-control axis for varying the water flow rate between a no water flow rate (full off) and a maximum water flow rate (full on), and movable along a substantially horizontal temperature-control axis for varying the temperature of the water flow from cold water only to hot water only. A handle is connected to the actuating stem to allow a user to manipulate the stem along its flow-control axis with an up-and-down (vertical) motion of the handle, and to manipulate the stem along its temperature-control axis with a back-and-forth (horizontal) motion of the handle.

In use, the user of such a single handle mixing valve type faucet will typically turn off the water flowing from the faucet by vertically lowering the handle at some position intermediate the cold water only and the hot water only positions of the actuating stem. The next time the faucet is used, the user typically will merely raise the handle vertically upwards from the position in which it was left from the prior use thereby causing a mixture of hot and cold water to exit the faucet, which results in drawing unneeded hot water from the hot water heater with a resultant waste of electric energy.

It would be desirable to provide a faucet which allows a faucet of the single handle mixing valve type to be turned off and on only when the handle is in the cold water only position to thereby eliminate unneeded usage of hot water with its resultant electric energy wastage.

SUMMARY OF THE INVENTION

It is an object of the present invention to provide a faucet of the single handle mixing valve type which allows it to be turned off and on only when the handle is in the cold water only position to thereby eliminate unneeded usage of hot water with its resultant electric energy wastage.

The energy saving faucet of the present invention includes a housing having a domed housing cap and a valve cartridge located within the housing.

The valve cartridge has a valve actuating stem movable along a vertical flow-control axis for varying water flow rate between no water flow rate and a maximum water flow rate. The valve actuating stem is also movable along a horizontal temperature-control axis for varying temperature of the water flow from cold water only to hot water only.

A handle assembly is connected to the actuating stem to allow a user to manipulate the stem along its vertical flow-control axis and to manipulate the stem along its horizontal temperature-control axis. The handle assembly has a grip portion and a socket portion. The socket portion slidingly engages the domed housing cap.

A recess extends substantially vertically along the outer surface of the domed housing cap.

A releasable stop member extends outwardly from the interior of the socket portion of the handle assembly, and is adapted to engage the recess when the grip portion of the handle assembly is moved along the vertical flow-control axis in its cold water only, position. The releasable stop member is adapted to release such engagement only upon application of a force along the horizontal temperature-control axis in the direction of the hot water only position.

A ramp is located along the lower periphery of the domed housing cap outside of the cold water only position, and is adapted to contact the releasable stop member to prevent said grip portion from being lowered into a full off position except when the faucet handle is in the cold water only position.

BRIEF DESCRIPTION OF THE DRAWINGS

FIG. 1 is a top plan view of a prior art faucet of the single handle mixing valve type;

FIG. 2 is a side elevation view of a prior art faucet of the single handle mixing valve type;

FIG. 3 is a schematic diagram showing various water flow rates and water temperatures that can be selected with a prior art faucet of the single handle mixing valve type;

FIG. 4 is a sectional partial view of the handle portion of a prior art faucet of the single handle mixing valve type;

FIG. 7 is a schematic diagram showing various water flow rates and water temperatures that can or cannot be selected with the improved single handle mixing valve type faucet of the present invention;

FIG. 8 is an isometric view of the upper housing portion of the improved single handle mixing valve type faucet of the present invention;

FIG. 9 is a horizontal section taken along line 9-9 of FIG. 8; and

FIG. 10 is a vertical section taken along line 10-10 of FIG. 8.

DESCRIPTION OF PREFERRED EMBODIMENTS

Figure 5:
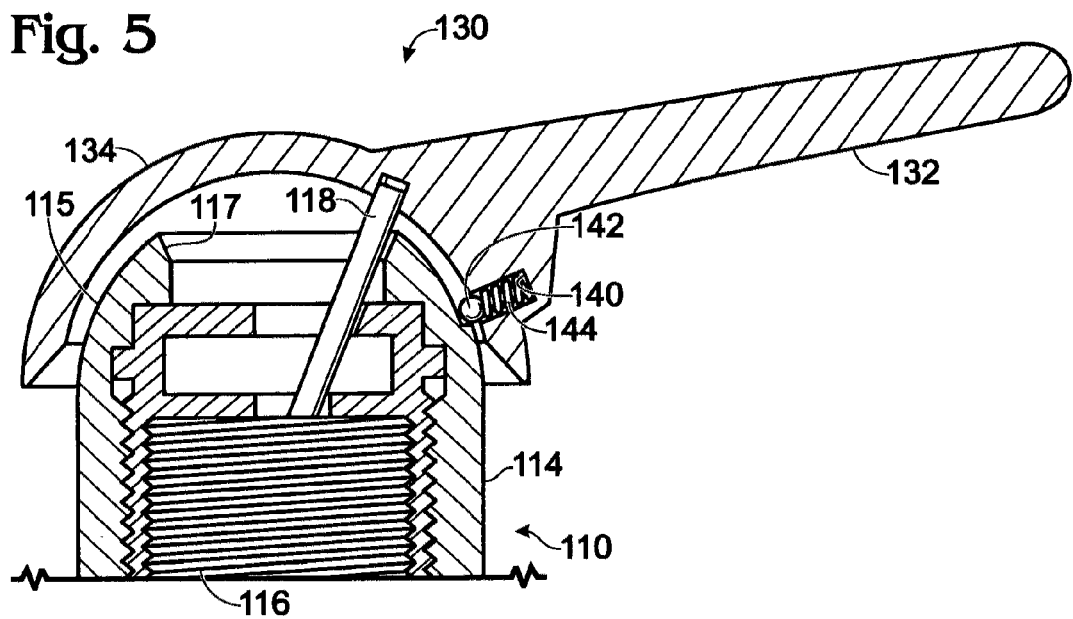
FIG. 5 is a sectional partial view of a preferred embodiment of the handle and upper housing portion of the improved single handle mixing valve type faucet of the present invention.

FIGS. 1 and 2 show the exterior configuration of a conventional single handle mixing valve type faucet 10, the exterior configuration of the single handle mixing valve type faucet 110 of the present invention being substantially the same.

The single handle mixing valve type-faucet 10 includes a base 12, a housing 14, a valve cartridge 16 located within housing 14, a valve adjustment stem 18 extending upwardly from valve cartridge 16, a spout 20, and a handle assembly 30. Handle assembly 30 includes a grip portion 32 and a socket portion 34.

The upper end of housing 14 is a domed cap 15 having a central circular opening 17 through which stem 18 passes. Socket portion 32 of handle assembly 30 fits over and slidingly engages the outer surface of domed cap 15 in a manner well known in the art.

Valve cartridge 16 can be any conventional valve mechanism used with single handle mixing valve type faucets, and has hot and cold water inlet ports (not shown) and a mixed water outlet port (not shown) communicating with the water passageway located within spout 20.

The inner end of valve adjustment stem 18 is connected to valve cartridge 16 in the manner used with the particular type of conventional valve mechanism employed. The outer end of valve adjustment stem 18 is connected to handle 30 in any manner used in the art.

FIG. 3 shows schematically the various temperatures and flow rates achievable with the conventional single handle mixing valve type faucet 10 during use, with the various zones corresponding to the position of handle 30.

Zones A, B, and C represent solely cold water flow, with zone A representing a zero cold water flow rate (off), zone C representing a maximum cold water flow rate, and zone B representing solely cold water flow at a rate intermediate zero and maximum cold water flow rates.

Zones G, H, and I represent solely hot water flow, with zone G representing zero hot water flow rate, zone I representing maximum hot water flow rate, and zone H representing a solely hot water flow rate intermediate zero and maximum hot water flow rates.

Zones D, E, and F represent water flow having a temperature intermediate that of solely hot or solely cold water, i.e., warm water. Zone D represents zero warm water flow rate, zone F represents maximum warm water flow rate, and zone E represents a warm water flow rate intermediate zero and maximum water flow rates.

When a user of conventional faucet 10 is finished with his or her use and desires to turn it off, the typical user will merely bring the handle 30 vertically downward until flow stops. Quite often the handle is located in warm water zone E or F or hot water zone H or I during use, and ends up in zone D or G upon shutoff. Thus, the next time faucet 10 is turned on, the handle 30 will be moved vertically upward from its shutoff position in zone D or G into either zone E or H, thereby immediately communicating the faucet with the hot water source even though hot water may not be desired.

Figure 6:
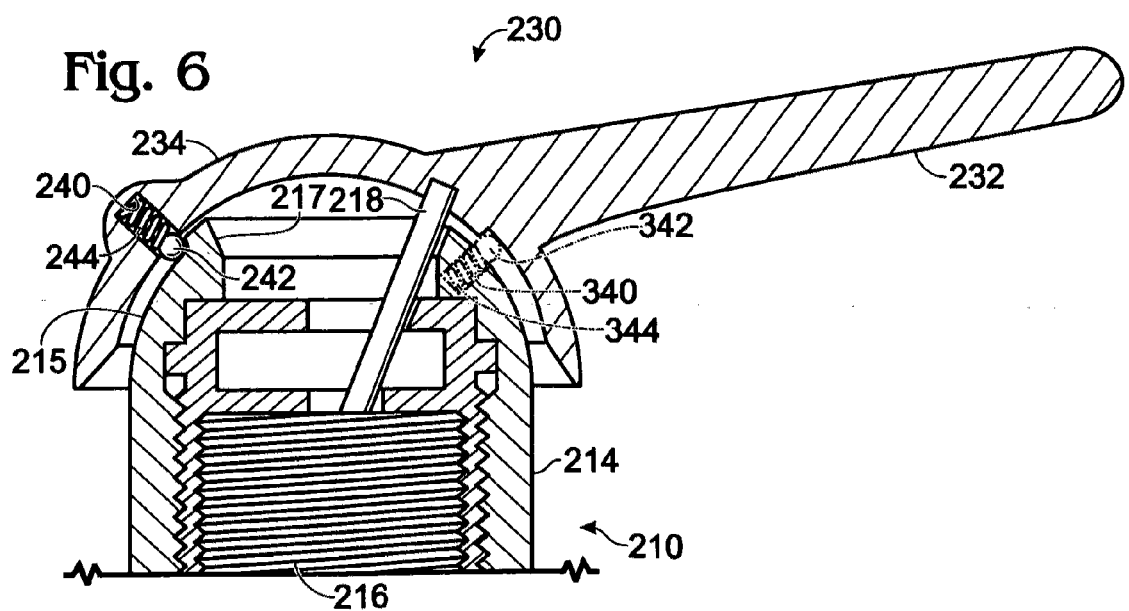
FIG. 6 is a sectional partial view of alternative embodiments of the handle and upper housing portion of the improved single handle mixing valve type faucet of the present invention.

FIGS. 5-10 illustrate the single handle mixing valve type faucet 110 of the present invention, the reference numbers of parts identical to those of the conventional single handle mixing valve type faucet 10 illustrated in FIGS. 1-4 being the same but increased by 100 (FIG. 5) or 200 (FIG. 6) or 300 (FIG. 6).

The single handle mixing valve type faucet 110 includes a base (not shown but can be identical to base 12 of the conventional faucet shown in FIG. 1), a housing 114, a valve cartridge 116 located within housing 114, a valve adjustment stem 118 extending upwardly from valve cartridge 116, a spout (not shown but can be identical to spout 20 of the conventional faucet shown in FIGS. 1 and 2), and a handle assembly 130:

Handle assembly 130 includes a grip portion 132 and a socket portion 134.

The upper end of housing 114 is a domed cap 115 having a central circular opening 117 through which passes a valve stem 118. Handle assembly 130 has an outer socket portion 132 which fits over and slidingly engages the outer surface of domed cap 115.

Valve cartridge 116 can be any conventional valve mechanism used with single handle mixing valve type faucets, and has hot and cold water inlet ports (not shown) and a mixed water outlet port (not shown) communicating with the water passageway located within the spout (not shown).

The inner end of valve adjustment stem 118 is connected to valve cartridge 116 in the manner used with the particular type of conventional valve mechanism employed. The outer end of valve adjustment stem 118 is connected to handle assembly 130 as shown in FIGS. 5 and 6, or in any other manner used in the art.

A cylindrical opening 140 is located in that part of socket portion 134 of handle assembly 130 adjacent the inner end of grip portion 132. A releasable stop member is located within opening 140. Preferably the releasable stop member includes a ball bearing 142 and attached spring 144. Spring 144 is positioned within cylindrical opening 140, and urges ball bearing 142 outwardly, as shown.

A recess 150 extends vertically upward from the base of domed cap 115 to the centrally located opening 117, and is positioned so that when the grip portion 132 of handle 130 turned to the cold water only position, and regardless of flow rate, ball bearing 142 is urged into contact with the wall of recess 150 by the force of spring 144.

When grip portion 132 of handle assembly 130 is vertically raised to turn on the water, ball bearing 142, being urged into contact with the wall of recess 150 by spring 144, resists grip portion 132 from being inadvertently turned horizontally, thereby preventing hot water from being introduced into valve 116.

If warm or hot water is needed, sufficient horizontal force must be applied to grip portion 132 in the direction of the hot water only zone to overcome the compression resistance of spring 144 and thereby cause ball bearing 142 to retract out of contact with the wall of recess 150. Recess 150 can be substantially L-shaped in cross-section, as shown, or any other suitable cross-sectional shape, such as semi-circular.

A ramp 160 slopes downwardly around the lower peripheral portion of domed cap 115 from the hot water only zone H (FIG. 7) to the intersection of cold water only zone A (no flow) and cold water only zone B (intermediate flow).

If during use the grip portion 132 of the handle 130 is positioned outside the cold water only zones A, B, or C, any attempt to turn off the faucet by lowering grip portion will fail as ball bearing 142 will come into contact with ramp 160, thereby preventing further downward movement of the handle.

In order to complete turning off the faucet the user must turn the grip portion 132 to one of the cold water only flow zones B or C to cause ball bearing 142 to come into contact with recess 150 and out of contact with ramp 160, thereby allowing the grip portion 132 to be vertically lowered into the cold water only no flow zone A and the flow stopped. The slope of ramp 160 is adapted to guide movement of grip portion 132 from an on position in zones H or E to the to the off position in zone A.

FIG. 7 schematically illustrates the operation of faucet 110 of the present invention. Since faucet 110 cannot be shut off in any position except zone A (cold water only, no flow), a user desiring to turn the faucet on is forced to raise the grip portion 132 vertically upward into cold water only zones B or C. Ball bearing 142 is in contact with the wall of recess 150 which resists inadvertently turning the grip portion horizontally into a warm water zone. When only cold water is desired, the faucet can be turned off by merely moving grip portion 132 vertically downward into zone A (cold water only, no flow).

If warm or hot water is desired the user must apply enough horizontal force in the direction of the hot water zones to cause spring 144 to compress and remove ball bearing 142 from contact with the wall of recess 150.

When the user is finished and desires to turn off the water, downward movement of the grip portion 132 in any zone but cold water only zones B and C will bring ball bearing 142 into contact with ramp 160 and prevent the water from being shut off. In order to complete shutting off the water the user must move the grip portion 132 rightward into one of cold water only zones B or C, and then continue downward movement of the grip portion into cold water only no flow zone A.

FIG. 6 shows two alternative embodiments relating to the placement of the releasable stop member (i.e., ball bearing 142 and spring 144), recess 150 and ramp 160.

In a first alternative embodiment shown in FIG. 6, the releasable stop member is moved 180 degrees around socket portion 234 of handle assembly 230, as shown by ball bearing 242 and spring 244. An associated recess and ramp (not shown) located on domed cap 215 would similarly be moved to function in the same manner as recess 150 and ramp 160 function relative to the releasable stop member (i.e., ball bearing 142 and spring 144) of FIG. 5.

In a second alternative embodiment (shown in phantom in FIG. 6), the releasable stop member comprised of ball bearing 342 and spring 344 are located in a cylindrical opening 340 in domed cap 215, and an associated recess and ramp (not shown) would be located in the underside of socket portion 234 of handle assembly 230 in that area located below grip portion 232 to function in the same manner as recess 150 and ramp 160 function relative to the releasable stop member (i.e., ball bearing 142 and spring 144) of FIG. 5.

It will be obvious to those having skill in the art that many changes may be made to the details of the above-described embodiments of this invention without departing from the underlying principles thereof. The scope of the present invention should, therefore, be determined only by the following claims.

The invention claimed is:

1. In a single handle mixing faucet including a housing having a domed housing cap with an outer surface and a lower periphery, a valve cartridge located within said housing, said valve cartridge having an actuating stem movable along a vertical flow-control axis for varying water flow rate between a no water flow rate zone and a maximum water flow rate zone, said actuating stem being movable along a horizontal temperature-control axis for varying temperature of the water flow from a cold water only zone to a hot water only zone, a handle assembly connected to the actuating stem to allow a user to manipulate the stem along its flow-control axis and to manipulate the stem along its temperature-control axis, said handle assembly having a grip portion with an inner end and a socket portion having an inner surface, said socket portion slidingly engaging said domed housing cap, wherein the faucet comprises:
a recess extending vertically along the said outer surface of said domed housing cap;
a releasable stop member extending outwardly from said inner surface of said socket portion of said handle assembly, said releasable stop member adapted to engage said recess when said grip portion of said handle assembly is moved along said vertical flow-control axis in said cold water only zone and adapted to release engagement upon application of a force along the horizontal temperature-control axis; and
a ramp located along said lower periphery of said domed housing cap outside of said cold water only zone and adapted to contact said releasable stop member to prevent said grip portion being lowered into a full off position except when in cold water only zone.

2. The faucet of claim 1 wherein said releasable stop member includes a ball bearing attached to a spring.

3. The faucet of claim 2 wherein said inner surface of said socket portion has a recess adapted to receive said spring of said releasable stop member.

4. The faucet of claim 3 wherein said recess is located adjacent said inner end of said grip portion of said handle assembly.

5. The faucet of claim 3 wherein said recess is located about 180 degrees from said inner end of said grip portion of said handle assembly.

6. The faucet of claim 2 wherein said domed housing cap has a recess adapted to receive said spring of said releasable stop member, and said recess extends vertically along said inner surface of said socket portion.

7. The faucet of claim 1 wherein said ramp slopes downwardly from the hot water only zone to the cold water only, no water flow rate zone.

8. A process of saving energy with a single handle mixing valve faucet comprising:
providing single handle mixing valve faucet including a housing having a domed housing cap, a valve cartridge located within said housing, said valve cartridge having an actuating stem movable along a vertical flow-control axis for varying water flow rate between a no water flow rate zone and a maximum water flow rate zone, said actuating stem being movable along a horizontal temperature-control axis for varying temperature of the water flow from a cold water only zone to a hot water only zone, a handle connected to the actuating stem to allow a user to manipulate the stem along its flow-control axis and to manipulate the stem along its temperature-control axis, said handle having a grip portion and a socket portion, said socket portion slidingly engaging said domed housing cap;
preventing said grip portion of said handle from allowing said actuating stem from moving into said no water flow rate zone except when said grip portion is positioned in the cold water only zone;
providing a horizontal movement resistance against horizontal movement of said actuating stem from said cold water only zone; and
preventing said grip portion of said handle from moving said actuating stem outside of said cold water only zone as said grip portion is moved from a no water flow rate zone into a water flow rate zone except by exertion of a horizontal force applied in the direction of the hot water only zone sufficient to overcome said horizontal movement resistance.

* * * * *